US012671885B2

(12) United States Patent
Okahana et al.

(10) Patent No.: US 12,671,885 B2
(45) Date of Patent: Jun. 30, 2026

(54) ELECTRONIC APPARATUS

(71) Applicant: SONY GROUP CORPORATION, Tokyo (JP)

(72) Inventors: Akinori Okahana, Tokyo (JP); Yasuhiro Kageyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/701,752

(22) PCT Filed: Sep. 12, 2022

(86) PCT No.: PCT/JP2022/034050
§ 371 (c)(1),
(2) Date: Apr. 16, 2024

(87) PCT Pub. No.: WO2023/074154
PCT Pub. Date: May 4, 2023

(65) Prior Publication Data
US 2025/0227350 A1      Jul. 10, 2025

(30) Foreign Application Priority Data
Oct. 25, 2021     (JP) ................................. 2021-174170

(51) Int. Cl.
*H04N 23/51*          (2023.01)
*G03B 17/02*          (2021.01)
(Continued)

(52) U.S. Cl.
CPC ............. *H04N 23/51* (2023.01); *G03B 17/02* (2013.01); *H04N 23/57* (2023.01); *H04N 23/45* (2023.01)

(58) Field of Classification Search
None
See application file for complete search history.

(56) References Cited

U.S. PATENT DOCUMENTS 10,188,350 B2 * 1/2019 Lee ..................... A61B 5/14551
2019/0238668 A1 * 8/2019 Chen ................... H04M 1/0264
(Continued)

FOREIGN PATENT DOCUMENTS

CN        110049214 A      7/2019
CN        113114876 A      7/2021
JP        2019-184854 A    10/2019

OTHER PUBLICATIONS

International Search Report and Written Opinion of PCT Application No. PCT/JP2022/034050, issued on Nov. 22, 2022, 08 pages of ISRWO.

*Primary Examiner* — Quan Pham
(74) *Attorney, Agent, or Firm* — CHIP LAW GROUP

(57)                    ABSTRACT

Provided is an electronic apparatus that includes an apparatus body, a first window portion, a second window member, and a support member. The apparatus body includes a first image-capturing section, a second image-capturing section, and a housing that includes an attachment hole through which the first image-capturing section and the second image-capturing section are exposed. The first window portion covers the first image-capturing section, and the second window member includes a second window portion that covers the second image-capturing section. The support member includes a first support that includes a first support base that supports a peripheral edge portion of the first window portion; and a second support that is formed integrally with the first support base. The first support includes an annular portion that is provided to a peripheral edge of the first support base and arranged between the first support base and the second support.

6 Claims, 6 Drawing Sheets

(51) Int. Cl.
     *H04N 23/45*        (2023.01)
     *H04N 23/57*        (2023.01)

(56) References Cited

U.S. PATENT DOCUMENTS

| | | |
|---|---|---|
| 2020/0059579 A1 | 2/2020 | Jarvis et al. |
| 2021/0037125 A1 | 2/2021 | Jung et al. |
| 2023/0164251 A1* | 5/2023 | Jung ..................... H04N 23/57 |
| | | 455/556.1 |

\* cited by examiner

ELECTRONIC APPARATUS

CROSS REFERENCE TO RELATED APPLICATIONS

This application is a U.S. National Phase of International Patent Application No. PCT/JP2022/034050 filed on Sep. 12, 2022, which claims priority benefit of Japanese Patent Application No. JP 2021-174170 filed in the Japan Patent Office on Oct. 25, 2021. Each of the above-referenced applications is hereby incorporated herein by reference in its entirety.

TECHNICAL FIELD

The present technology relates to, for example, an electronic apparatus that includes a plurality of camera modules.

BACKGROUND ART

Conventionally, a multi-ocular electronic apparatus that includes a plurality of camera modules is known, where camera modules of the plurality of camera modules are arranged to have a specified positional relationship with each other. Such an electronic apparatus includes a plurality of camera modules and a support member used to support the plurality of camera modules such that the camera modules of the plurality of camera modules have a specified positional relationship with each other, as disclosed in, for example, Patent Literature 1.

CITATION LIST

Patent Literature

Patent Literature 1: Japanese Patent Application Laid-open No. 2019-184854

DISCLOSURE OF INVENTION

Technical Problem

However, when camera modules of a plurality of camera modules are included in the electronic apparatus disclosed in Patent Literature 1, the unification of the camera modules will be lost and thus a design quality of the electronic apparatus will be reduced since the camera modules have different sizes.

In view of the circumstances described above, it is an object of the present technology to provide an electronic apparatus of which a design quality will not be reduced even when the electronic apparatus includes camera modules having different sizes.

Solution to Problem

In order to achieve the object described above, an electronic apparatus according to an embodiment of the present technology includes an apparatus body, a first window portion, a second window member, and a support member.

The apparatus body includes a first image-capturing section, a second image-capturing section, and a housing that includes an attachment hole through which the first image-capturing section and the second image-capturing section are exposed.

The first window portion covers the first image-capturing section, and the second window member includes a second window portion that covers the second image-capturing section.

The support member includes a first support that includes a first support base that supports a peripheral edge portion of the first window portion, the first support closing the attachment hole; and a second support that is formed integrally with the first support base, the second support supporting a peripheral edge portion of the second window member, the second support closing the attachment hole. The first support includes an annular portion that is provided to a peripheral edge of the first support base and arranged between the first support base and the second support.

In the electronic apparatus described above, the annular portion is arranged between the first support base supporting the first window portion, and the second support. Consequently, even when the electronic apparatus includes image-capturing sections having different sizes, the unification of the image-capturing sections will not be lost since the annular portion is arranged between the first support base and the second support. This makes it possible to provide the electronic apparatus of which a design quality is not be reduced.

A height at which the first support is situated from the housing may be greater than a height at which the second support is situated from the housing.

The electronic apparatus may further include a base member obtained by integrally forming the first support base and the second support, the first support base and the annular portion may be different components, and the annular portion may be an annular component that is assembled to the base member.

The annular portion may further include an inclination portion, and the inclination portion may cover a portion of the second support, as viewed from a direction of an optical axis of the first image-capturing section.

The attachment hole may further include a circular first hole, a second hole that protrudes from the first hole toward a certain diameter direction of the first hole, and a third hole that protrudes from the first hole toward another diameter direction of the first hole that is opposite to the certain diameter direction toward which the second hole protrudes; the second hole protruding toward the certain diameter direction may have a width smaller than a length of a diameter of the first hole; and the third hole protruding toward the other diameter direction opposite to the certain diameter direction toward which the second hole protrudes may have a width smaller than a length of a diameter of the first hole.

The electronic apparatus may further include the apparatus body including a third image-capturing section, and the housing including the attachment hole through which the third image-capturing section is exposed; a third window member that includes a third window portion that covers the third image-capturing section; and the support member including a third support that is formed integrally with the first support base, the third support supporting a peripheral edge portion of the third window member, the third support closing the attachment hole, the first support including the annular portion being provided to the peripheral edge of the first support base and arranged between the first support base and the third support.

MODE(S) FOR CARRYING OUT THE INVENTION

Embodiments according to the present technology will now be described below with reference to the drawings. Further, in the following description, an X axis, a Y axis, and a Z axis in each figure respectively represent directions of three axes that are orthogonal to each other, where the X axis corresponds to a vertical direction of an electronic apparatus 10, the Y axis corresponds to a horizontal direction of the electronic apparatus 10, and the Z axis corresponds to a thickness direction of the electronic apparatus 10.

[Configuration of Electronic Apparatus]

Figure 1:
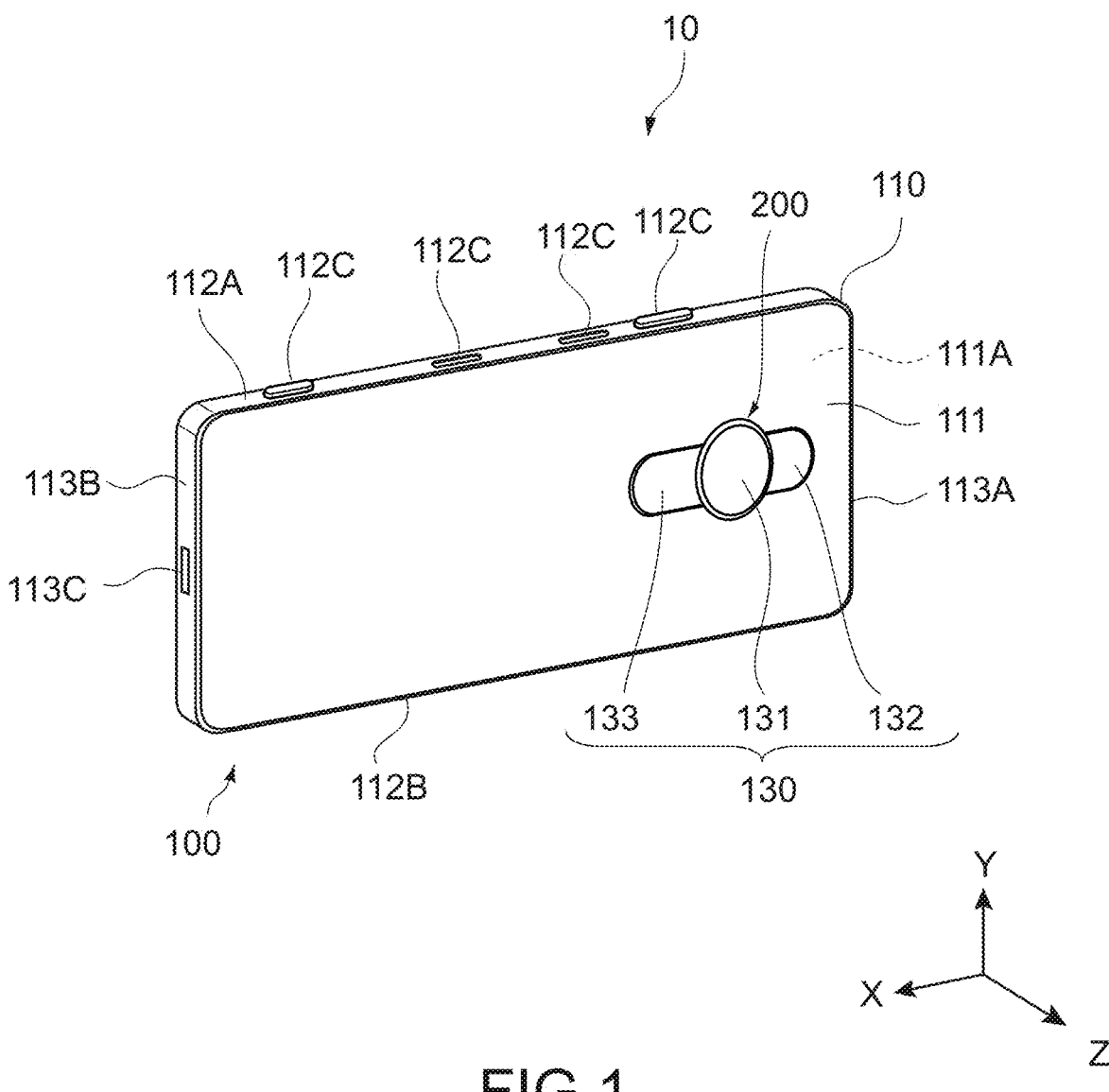
FIG. 1 is an overall perspective view of an electronic apparatus according to an embodiment of the present technology.
Figure 2:
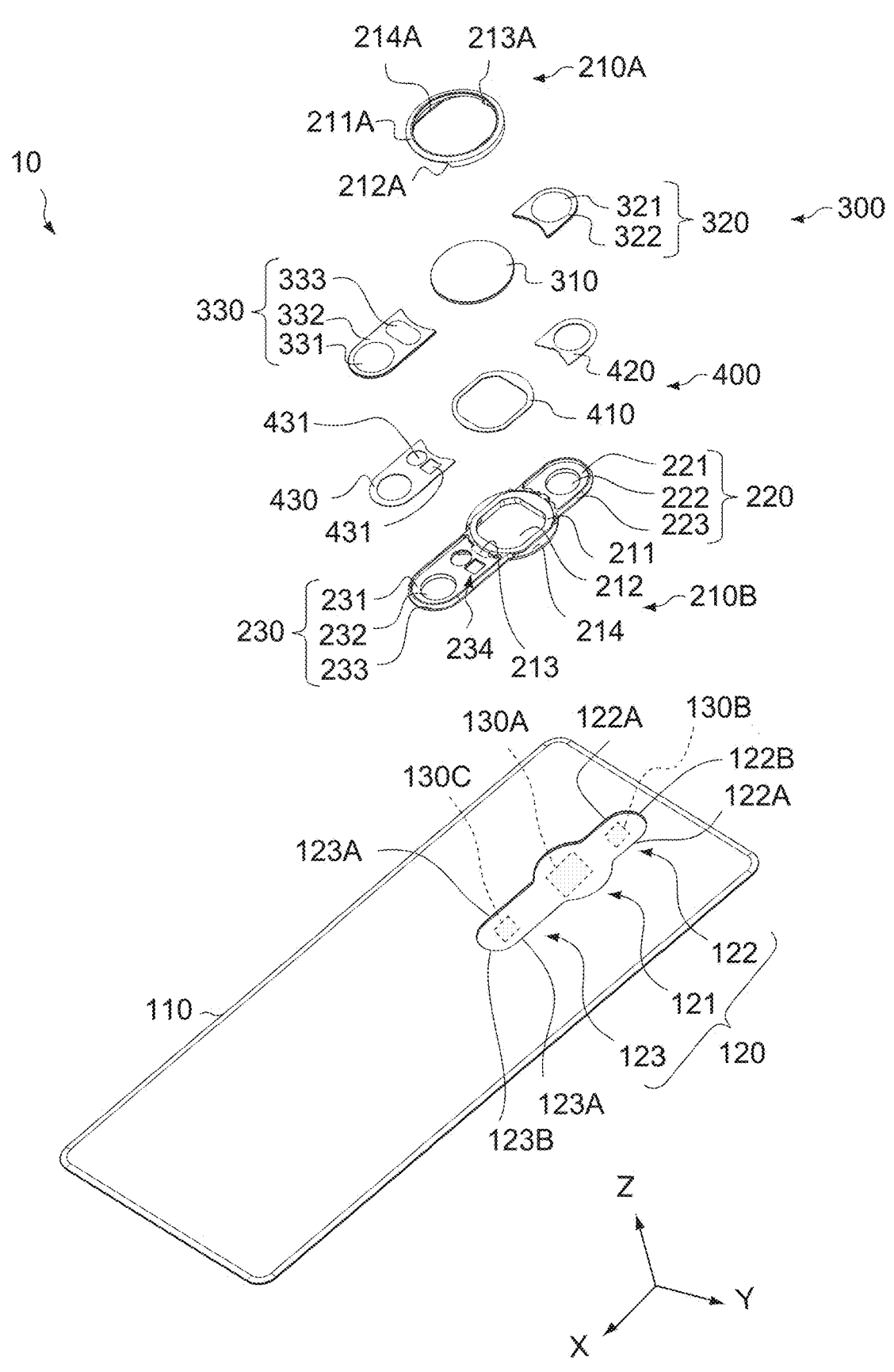
FIG. 2 is an exploded perspective view of the electronic apparatus.
Figure 3:
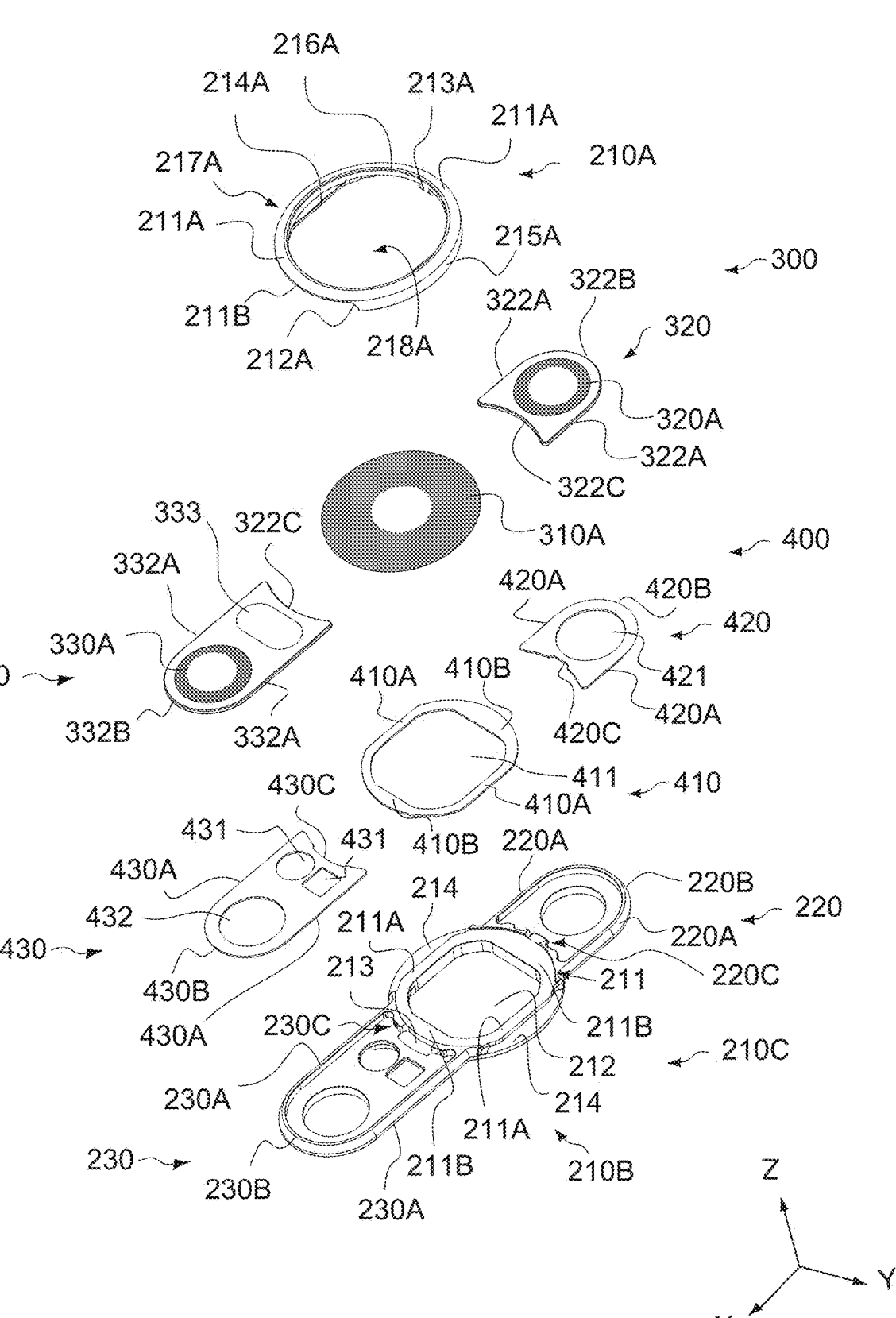
FIG. 3 is an enlarged view of a portion of FIG. 2.
Figure 4:
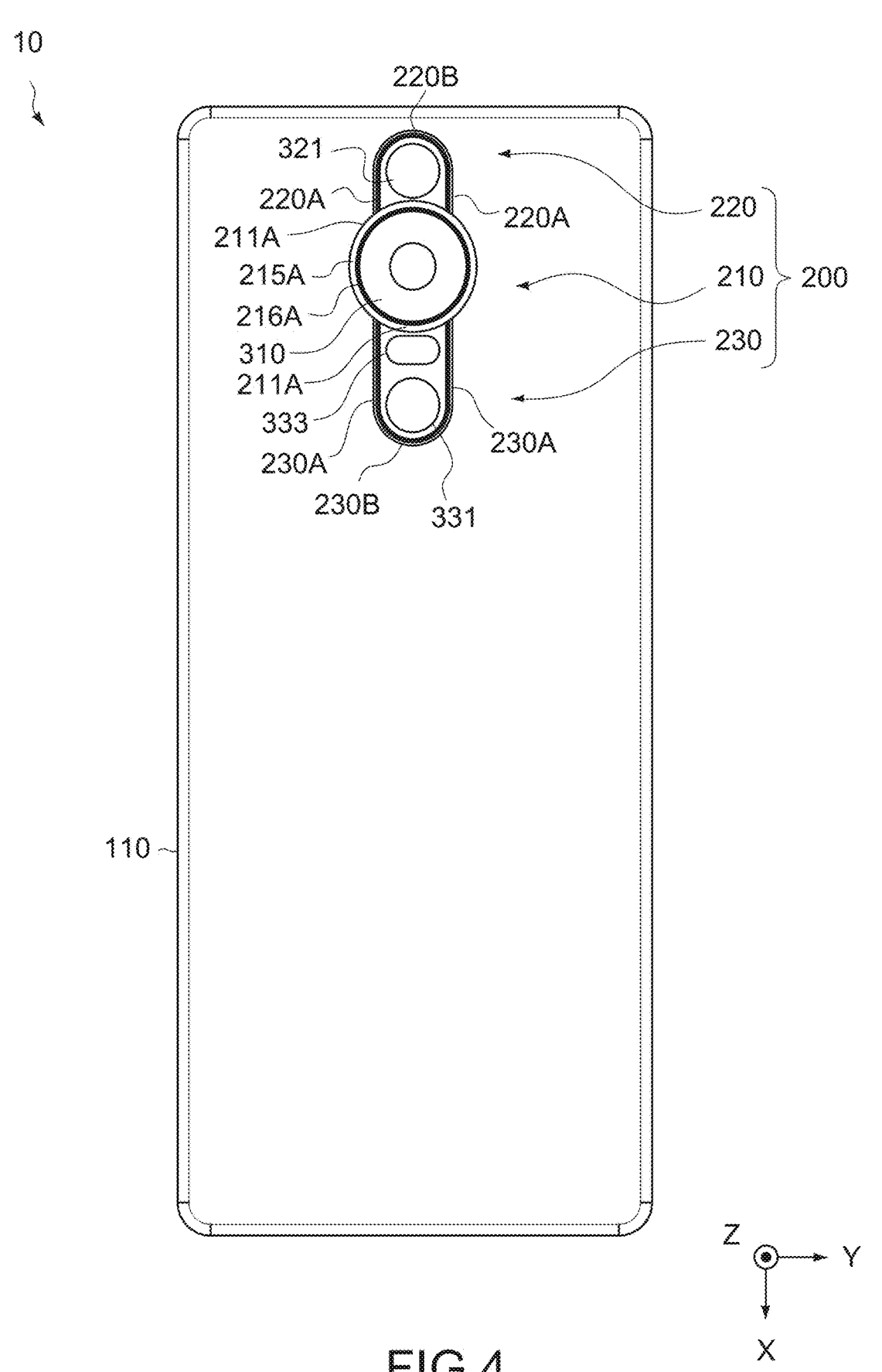
FIG. 4 is a rear view of the electronic apparatus.
Figure 5:
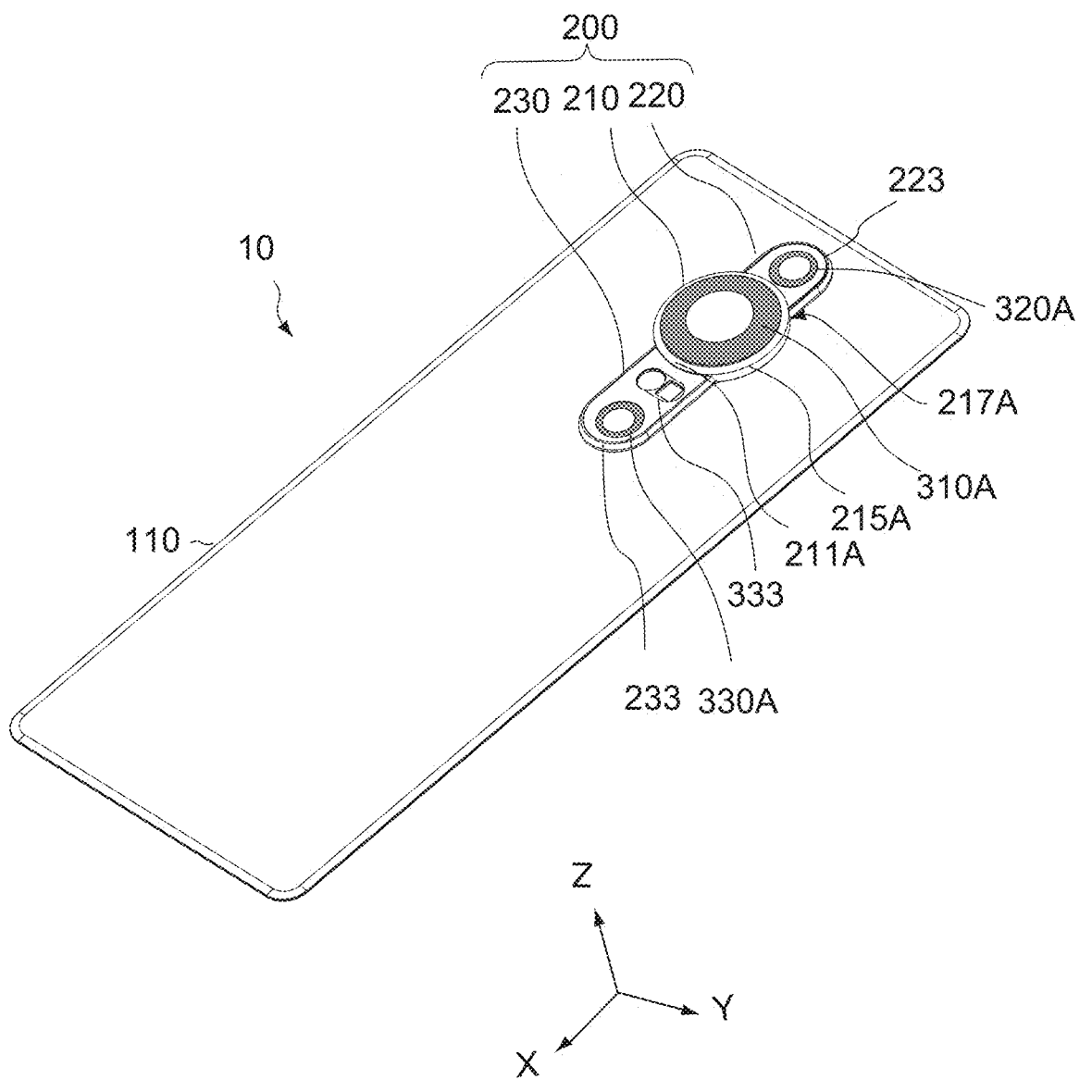
FIG. 5 is a perspective view of the electronic apparatus.
Figure 6:
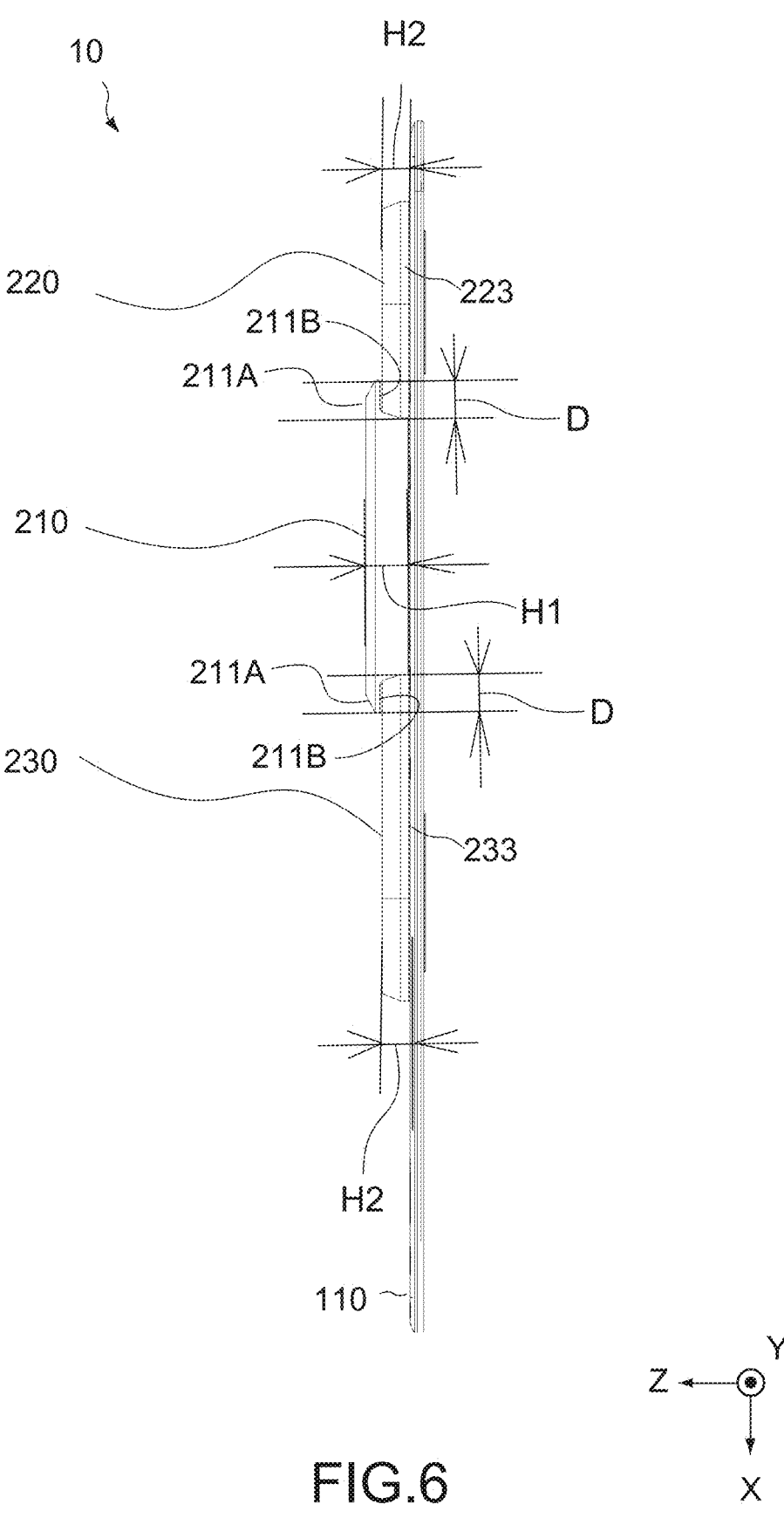
FIG. 6 is a side view of the electronic apparatus.

FIG. 1 is an overall perspective view of the electronic apparatus 10 according to an embodiment of the present technology, and FIG. 2 is an exploded perspective view of the electronic apparatus 10. Further, FIG. 3 is an enlarged view of components illustrated in FIG. 2 except for a housing 110, and FIG. 4 is a rear view of the electronic apparatus 10. Furthermore, FIG. 5 is a perspective view of the electronic apparatus 10, and FIG. 6 is a side view of the electronic apparatus 10. In the present embodiment the electronic apparatus 10 is a smartphone that includes an image-capturing function, but is not limited thereto. The electronic apparatus 10 may be, for example, a cellular phone, a tablet, a PC, or a digital camera.

As illustrated in FIG. 1, the electronic apparatus 10 includes an apparatus body 100 and a support member 200.

The apparatus body 100 includes a first principal surface 111 and a second principal surface 111A, where the first principal surface 111 has a shape of a rectangle having a long side in parallel with an X-axis direction and a short side in parallel with a Y-axis direction. The second principal surface 111A is a surface situated opposite to the first principal surface 111, and has the same shape as the first principal surface. The electronic apparatus 10 further includes a pair of long lateral surfaces 112A and 112B connecting the first principal surface 111 and the second principal surface 111A, and a pair of short lateral surfaces 113A and 113B connecting the first principal surface 111 and the second principal surface 111A. Each of the paired long lateral surfaces 112A and 112B connects a corresponding one of the long sides of the rectangular first principal surface 111 and a corresponding one of the long sides of the second principal surface 111A. Each of the paired short lateral surfaces 113A and 113B connects a corresponding one of the short sides of the rectangular first principal surface 111 and a corresponding one of the short sides of the second principal surface 111A. The housing 110 of the electronic apparatus 10 is formed by the first principal surface 111, the second principal surface 111A, the pair of long lateral surfaces 112A and 112B, and the pair of short lateral surfaces 113A and 113B. Further, image-capturing sections 130 (described later), electronic components, and the like are arranged in the housing 110 inside of the electronic apparatus 10.

The "rectangle" described herein includes not only a quadrilateral having four right angles, but also a quadrilateral having four rounded right angles. When other shapes are described, the other shape includes not only a literally interpreted shape but also substantially similar shapes such as a shape having rounded angles.

The first principal surface 111 includes at least two image-capturing sections 130. In the present embodiment, the first principal surface 111 includes three image-capturing sections 130 that are camera modules. The three image-capturing sections 130 respectively include a first camera lens 131 that is a first image-capturing section, a second camera lens 132 that is a second image-capturing section, and a third camera lens 133 that is a third image-capturing section.

In the present embodiment, the first camera lens 131 is a lens for ordinary use, the second camera lens 132 is a super-wide-angle lens, and the third camera lens 133 is a telephoto lens. The second camera lens 132, the first camera lens 131, and the third camera lens 133 are situated on the first principal surface 111 in this order in a line in parallel with the X direction toward one of the short lateral surfaces that is the short lateral surface 113B. The arrangement described above is adopted in the present embodiment, but the arrangement is not limited thereto. For example, the first camera lens 131, the second camera lens 132, and the third camera lens 133 may be situated on the first principal surface 111 in this order in a line in parallel with the X direction toward one of the short lateral surfaces that is the short lateral surface 113B.

One of the long lateral surfaces that is the long lateral surface 112A includes a plurality of keys 112C including a power key, a camera key, a sound volume key, and a voice assistance starting key. Some of the keys 112C (such as a power key and a camera key) protrude from the long lateral surface 112A in parallel with the Y direction. The other keys 112C are in plane with the long lateral surface 112A or recessed relative to the long lateral surface 112A in parallel with the Y direction.

One of the short lateral surfaces that is the short lateral surface 113B includes a port 113C into which a cable (not illustrated) is inserted.

(Image-Capturing Section)

As described above, the image-capturing sections 130 respectively include the first camera lens 131, the second camera lens 132, and the third camera lens 133.

Further, the image-capturing sections 130 respectively include an imaging device 130A, an imaging device 130B, and an imaging device 130C that are arranged inside of the apparatus body 100, where the imaging device 130A is arranged on an optical axis of the first camera lens 131 (on the Z axis), the imaging device 130B is arranged on an optical axis of the second camera lens 132 (on the Z axis), and the imaging device 130C is arranged on an optical axis of the third camera lens 133 (on the Z axis) (refer to FIG. 2).

As viewed from a Z-axis direction, the first camera lens 131 exposed through an attachment hole 120 has a lens diameter having a size similar to the size of a first window portion 310 described later, and the first camera lens 131 has a larger lens diameter than the second camera lens 132 (of which the lens diameter has a size similar to the size of a second window portion 321) and the third camera lens 133 (of which the lens diameter has a size similar to the size of a third window portion 331) (FIGS. 1 and 3). In the present embodiment, the second camera lens 132 and the third camera lens 133 have similar-sized lens diameters. Without being limited thereto, the second camera lens 132 and the third camera lens 133 may have different-sized lens diameters.

As illustrated in FIG. 2, the imaging device 130A is formed to be larger than the imaging devices 130B and 130C. Thus, the first camera lens 131 is formed to be larger in size than the second camera lens 132 and the third camera lens 133, as described above.

Further, for example, a digital camera that includes the imaging devices 130A, 130B, and 130C, which are complementary metal-oxide semiconductor (CMOS) sensors or charge-coupled device (CCD) sensors, is used as the image-capturing sections 130. Moreover, for example, an infrared camera that includes an infrared illumination such as an infrared LED may be used.

(Housing)

As illustrated in FIG. 2, the housing 110 is substantially rectangular, and includes the attachment hole 120 through which the image-capturing sections 130 are exposed. The attachment hole 120 is formed such that the first camera lens 131, the second camera lens 132, and the third camera lens 133 are exposed through the attachment hole 120.

In the present embodiment, the attachment hole 120 is one hole obtained by connecting three holes that are a first hole 121, a second hole 122, and a third hole 123. The first hole 121 is a circular hole, and the first camera lens 131 is exposed through the first hole 121. The first hole 121 has a size similar to the size of the diameter of the first camera lens 131.

The second hole 122 is a hole having a shape that protrudes from a portion of the circumference of the first hole 121 in a negative direction on the X axis that corresponds to a direction of a diameter of the first hole 121, and the second camera lens 132 is exposed through the second hole 122. The second hole 122 is a hole having a shape that is formed by two straight lines 122A and a portion 122B to extend in the negative direction on the X axis from the first hole 121. The two straight lines 122A face each other in the Y-axis direction, the portion 122B is convex in the negative direction on the X axis, and tips of the two straight lines 122A are connected to each other through the convex portion 122B. The convex portion of the second hole 122 has a size similar to the size of the diameter of the second camera lens 132.

The third hole 123 is a hole having a shape that protrudes from a portion of the circumference of the first hole 121 in a positive direction on the X axis that corresponds to a direction of a diameter of the first hole 121, and the third camera lens 133 is exposed through the third hole 123. The third hole 123 is a hole having a shape that is formed by two straight lines 123A and a portion 123B to extend in the positive direction on the X axis from the first hole 121. The two straight lines 123A face each other in the Y-axis direction, the portion 123B is convex in the positive direction on the X axis, and tips of the two straight lines 123A are connected to each other through the convex portion 123B. The convex portion of the second hole 122 has a size similar to the size of the diameter of the second camera lens 132.

The following is a positional relationship between the first hole 121, the second hole 122, and the third hole 123 of the attachment hole 120. As illustrated in FIG. 2, the second hole 122 and the third hole 123 are respectively connected to two sides of the first hole 121 in the X-axis direction, with the first hole 121 being situated between the second hole 122 and the third hole 123.

(Window Member)

As illustrated in FIGS. 2 and 3, a window-member group 300 includes glass, and serves as a protection cover that covers the camera lenses 131, 132, and 133. The window-member group 300 includes the first window portion 310, a second window member 320, and a third window member 330, where the first window portion 310 covers the first camera lens 131 and is parallel to an XY plane, the second window member 320 covers the second camera lens 132 and is parallel to the XY plane, and the third window member 330 covers the third camera lens 133 and is parallel to the XY plane.

The first window portion 310 is circular as viewed from the Z-axis direction and is supported by a first support base 210B described later, and subject light is transmitted through the first window portion 310.

The second window member 320 has a shape that is formed by two straight lines that each extend in parallel with the X-axis direction, a portion 322B, and a portion 322C. The two straight lines face each other in the Y-axis direction, the portion 322B is convex in the negative direction on the X axis, and the portion 322C is convex in the negative direction on the X axis. One of ends of one of the two straight lines 322A and one of ends of another of the two straight lines 322A that are situated in the negative direction on the X axis are connected to each other through the convex portion 322B, and another of the ends of the one of the two straight lines 322A and another of the ends of the other of the two straight lines 322A that are situated in the positive direction on the X axis are connected to each other through the convex portion 322C. The second window member 320 is supported by a second support base 221 described later. Further, the second window member 320 includes a circular second camera window 321 that has a smaller diameter than the first window portion 310 through which subject light is transmitted, and a second window frame 322 that is a frame of the second camera window 321.

The third window member 330 has a shape that is formed by two straight lines that each extend in parallel with the X-axis direction, a portion 332B, and a portion 332C. The two straight lines face each other in the Y-axis direction, the portion 332B is convex in the positive direction on the X axis, and the portion 332C is convex in the positive direction on the X axis. One of ends of one of the two straight lines 332A and one of ends of another of the two straight lines 332A that are situated in the positive direction on the X axis are connected to each other through the convex portion 332B, and another of the ends of the one of the two straight lines 332A and another of the ends of the other of the two straight lines 332A that are situated in the negative direction on the X axis are connected to each other through the convex portion 332C. The third window member 330 is supported by a third support base 231 described later. Further, the third window member 330 includes a third camera window 331 that has a smaller diameter than the first window portion 310 through which subject light is transmitted, and a third window frame 332 that is a frame of the third camera window 331.

Further, a peripheral edge portion 310A of the first window portion 310 that is situated on a side of an adhesive paper 410, a peripheral edge portion 321A of the second camera window 321 that is situated on a side of an adhesive paper 420, and a peripheral edge portion 331A of the third camera window 331 that is situated on a side of an adhesive paper 430 are decorated in black. This prevents stray light from unintendedly entering the electronic apparatus 10 from the outside of the electronic apparatus 10. Further, the decoration in black prevents a structure of, for example, electronic components situated inside of the electronic apparatus 10 from being visible (refer to FIG. 3).

Furthermore, in the present embodiment, the third window member 330 includes an opening 333 that serves as a ranging window for a ranging sensor (not illustrated) used to focus on a subject. However, the opening 333 is not limited to being provided to the third window member 330, and may be provided to the first window portion 310 or the second window member 320.

(Adhesive Paper)

Both surfaces of an adhesive paper 400 illustrated in FIGS. 2 and 3 are adherable, and the adhesive paper 400 bonds the window-member group 300 and a base member 210B described later. The adhesive paper 400 includes a first adhesive paper 410 to which the first window portion 310 is bonded, a second adhesive paper 420 to which the second window member 320 is bonded, and a third adhesive paper 430 to which the third window member 330 is bonded. The peripheral edge portion 310A of the first window portion 310, the second window frame 322 of the second window member 320, and the third window frame 332 of the third window member 330 are bonded to one of the surfaces of the adhesive paper 400. The base member 210B described later is bonded to another of the surfaces of the adhesive paper 400.

The first adhesive paper 410 includes an opening 411 and is formed along the peripheral edge portion 310A decorated in black in the first window portion 310. The first adhesive paper 410 is substantially rectangular and formed by first straight portions 410A and connection portions 410B. The first straight portions 410A are situated across the opening 411 from each other and each extend in parallel with the X-axis direction. One of ends of one of the straight portions 410A and one of ends of another of the straight portions 410A that are situated in the negative direction on the X axis protrude in the negative direction on the X axis to be connected to each other through one of the connection portions 410B, and another of the ends of the one of the straight portions 410A and another of the ends of the other of the straight portions 410A that are situated in the positive direction on the X axis protrude in the positive direction on the X axis to be connected to each other through another of the connection portions 410B.

The second adhesive paper 420 includes an opening 421 and is formed along the peripheral edge portion 320A decorated in black in the second window portion 320. Further, the second adhesive paper 420 has a shape that is formed by two straight portions 420A that each extend in parallel with the X-axis direction, a portion 420B, and a portion 420C. The two straight portions 420A face each other in the Y-axis direction, the portion 420B is convex in the negative direction on the X axis, and the portion 420C is convex in the negative direction on the X axis. One of ends of one of the two straight portions 420A and one of ends of another of the two straight portions 420A that are situated in the negative direction on the X axis are connected to each other through the convex portion 420B, and another of the ends of the one of the two straight portions 420A and another of the ends of the other of the two straight portions 420A that are situated in the positive direction on the X axis are connected to each other through the convex portion 420C.

The third adhesive paper 430 includes two sensor openings 431 serving as openings for a ranging sensor and an opening 432, and is formed along the peripheral edge portion 330A decorated in black in the third window portion 330. Further, the third adhesive paper 430 has a shape that is formed by two straight portions 430A that each extend in parallel with the X-axis direction, a portion 430B, and a portion 430C. The two straight portions 430A face each other in the Y-axis direction, the portion 430B is convex in the negative direction on the X axis, and the portion 430C is convex in the negative direction on the X axis. One of ends of one of the two straight portions 430A and one of ends of another of the two straight portions 430A that are situated in the negative direction on the X axis are connected to each other through the convex portion 430B, and another of the ends of the one of the two straight portions 430A and another of the ends of the other of the two straight portions 430A that are situated in the positive direction on the X axis are connected to each other through the convex portion 430C.

(Support Member)

As illustrated in FIGS. 2 to 5, the support member 200 includes the base member 210B and an annular portion 210A. A base member 210C is a member obtained by integrally forming the first support base 210B, a second support 220, and a third support 230. A first support 210 is circular and includes the first support base 210B and the annular portion 210A described later.

The support member 200 is made of aluminum and is processed by die casting. Without being limited thereto, the support member 200 may be made of plastic or stainless.

The first support base 210B is circular as viewed from the Z-axis direction, and includes a rectangular opening 212 at the center of the first support base 210B. Further, a peripheral edge base 211 that is formed on a peripheral edge of the opening 212 supports the first window portion 310 through the adhesive paper 410. The peripheral edge base 211 is substantially rectangular and formed by two straight portions 211A and connection portions 211B. The two straight portions 211A each extend in parallel with the X-axis direction. One of ends of one of the straight portions 211A and one of ends of another of the straight portions 211A that are situated in the negative direction on the X axis protrude in the negative direction on the X axis to be connected to each other through one of the connection portions 211B, and another of the ends of the one of the straight portions 211A and another of the ends of the other of the straight portions 211A that are situated in the positive direction on the X axis protrude in the positive direction on the X axis to be connected to each other through another of the connection portions 211B.

Further, the first support base 210B includes a bonding portion 214 used when the first support base 210B is bonded to the annular portion 210A. The bonding portion 214 is provided to the straight portion 211A to be situated opposite to the opening 212 in the Y-axis direction. Further, the bonding portion 214 is situated more negative in the Z-axis direction than the straight portion 410. This makes it possible to prevent an adhesive from protruding toward the housing 110 when the adhesive is applied to the bonding portion 214.

The second support 220 includes the second support base 221 supporting the second window member 320 through the adhesive paper 420, and a wall portion 223 that surrounds a peripheral edge of the second support base 221. The second support 220 includes a circular opening 222, and has a shape that is formed by two straight lines 220A that each extend in parallel with the X-axis direction, a portion 220B, and a portion 220C. The two straight lines 220A face each other in the Y-axis direction, the portion 220B is convex in the negative direction on the X axis, and the portion 220C is convex in the negative direction on the X axis. One of ends of one of the two straight portions 220A and one of ends of another of the two straight portions 220A that are situated in the negative direction on the X axis are connected to each other through the convex portion 220B, and another of the ends of the one of the two straight portions 220A and another of the ends of the other of the two straight portions 220A that are situated in the positive direction on the X axis are connected to each other through the convex portion 220C.

The third support 230 includes the third support base 231 supporting the third window portion 330 through the adhesive paper 430, and a wall portion 233 that surrounds a peripheral edge of the third support base 231. The third support 230 includes a circular opening 232 and two sensor openings 234 serving as openings for a ranging sensor, and the third support 230 has a shape that is formed by two straight lines 230A that each extend in parallel with the X-axis direction, a portion 230B, and a portion 230C. The two straight lines 230A face each other in the Y-axis direction, the portion 230B is convex in the positive direction on the X axis, and the portion 230C is convex in the negative direction on the X axis. One of ends of one of the two straight portions 230A and one of ends of another of the two straight portions 230A that are situated in the positive direction on the X axis are connected to each other through the convex portion 230B, and another of the ends of the one of the two straight portions 230A and another of the ends of the other of the two straight portions 230A that are situated in the positive direction on the X axis are connected to each other through the convex portion 230C.

A groove 213 is provided between the first support base 210B and the second support 220. The groove is substantially rectangular, and is provided around a middle point in the connection portion 211B in the Y-axis direction. A protrusion 213A of the annular portion 210A that will be described later is fitted into the groove 213.

The base member 210C includes a fitting portion (not illustrated) that is fitted into the attachment hole 120 of the housing 110. The fitting portion is provided to the base member 210 on a side of the housing 110 and has a shape along the attachment hole 120. The base member 210 is formed to be slightly larger in size than the attachment hole 120, as viewed from the Z-axis direction. An adhesive is applied around the attachment hole 120, and this results in the base member 210C and the housing 110 being fixed to each other when the base member 210C is fitted into the attachment hole 120. Consequently, the base member 210C includes a function of sealing the inside of the housing 110.

In the present embodiment, the support member 200 is arranged in the X-axis direction, with the first support base 210B being situated between the second support base 221 and the third support base 231.

As illustrated in FIGS. 4 and 5, the first support base 210B is larger in width in the Y-axis direction than the second support 220 and the third support 230, as viewed from the Z-axis direction, and the second support 220 and the third support 230 are arranged in a range of the width of the first support base 210B, as viewed from the X-axis direction.

As described above, the first support 210 includes the first support base 210B and the annular portion 210A. The annular portion 210A is annularly provided to a peripheral edge of the first support base 210B. Further, the annular portion 210A is arranged between the first support base 210B and the second support 220 and between the first support base 210B and the third support 230, as viewed from the Z-axis direction.

The annular portion 210A is an annular member that includes a center hole 218A, and the annular portion 210A includes inclination portions 211A, protrusions 213A, joining portions 214A, a covering portion 215A, and a peripheral edge portion 217A, as illustrated in FIGS. 2 and 3.

The annular portion 210A includes the annularly formed peripheral edge portion 217A. The peripheral edge portion

217A is formed to be slightly larger in size than the first support base 210B, as viewed from the Z-axis direction.

A top-surface portion 216A is formed on the peripheral edge portion 217A along the annular peripheral edge portion 217A in a positive direction on the Z axis. The top-surface portion 216A includes a surface parallel to the XY plane.

The joining portion 214A of the annular portion 210 has a shape that is similar to a shape of the bonding portion 214 formed on an inner peripheral surface of the peripheral edge portion 217A, and is joined to the bonding portion 214 through an adhesive.

Further, the annular portion 210A includes the protrusion 213A protruding in a negative direction on the Z axis from the peripheral edge portion 217A. The protrusion 213A is provided to each of two sides on the circumference of the peripheral edge portion 217A and fitted into the groove 213. Here, an adhesive is applied to the protrusion 213A, and the protrusion 213A is bonded to the groove 213. The portions other than the bonding portion 214 and the joining portion 214A are bonded, and this makes it possible to enhance the strength of engagement of the annular portion 210A and the first support base 210B.

The covering portion 215A is formed to protrude in the negative direction on the Z axis from the circumference of the peripheral edge portion 217A. Further, in other words, the covering portion 215A is formed such that a portion of the covering portion 215A extends toward the housing 110 from a position, on the peripheral edge portion 217A, that corresponds to the bonding portion 214. As viewed from the X-axis direction and the Y-axis direction, the covering portion 215 is formed to cover the first support base 210B, and formed to cover the bonding portion 214 in particular. This makes it possible to improve the appearance. Further, the covering portion 215A includes notches 212A that are respectively brought into contact with the second support 220 and the third support 230. The notches 212A are respectively formed along the wall portion 223 and the wall portion 233. This enables the annular portion 210A to be engaged with the base member 210C.

The inclination portions 211A each include a back surface portion 211B on the housing 110, and are respectively inclined to extend toward the second support 220 and the third support 230 from the top-surface portion 216A of the peripheral edge portion 217A. In other words, each inclination portion 211A is formed at a position that corresponds to a corresponding connection portion 211B when the annular portion 210A is engaged with the first support base 210B. The inclination portions 211A are respectively inclined to extend toward the second support 220 and the third support 230 from the top-surface portion 216 at an angle of 45 degrees in the negative direction on the Z axis. In the present embodiment, the inclination angle at which the inclination portion 211A is inclined from the top-surface portion 216 to the housing 110 is 45 degrees, but the inclination angle is not limited thereto.

As illustrated in FIG. 6, a height H1 at which the first support 210 is situated from the housing 110 is set greater than a height H2 at which the second support 220 and the third support 230 are situated from the housing 110. Further, as illustrated in FIG. 6, the inclination portions 211A are respectively inclined to extend toward the second support 220 and the third support 230, as viewed from the Y-axis direction, and the back surface portions 211B of the inclination portions 211A are respectively brought into contact with the second support 220 and the third support 230 to be provided with portions that respectively overlap the second support 220 and the third support 230. The overlap portions each correspond to a region D. The back surface portions 211B are respectively brought into contact with the third support 230 and the second support 220 at the levels of the wall portions 233 and 223.

This makes it possible to cover up a difference in level between the support members 200 that is caused when the image-capturing sections 130 having different sizes are arranged in the housing 110, and thus to obtain a configuration without a design quality being reduced. Further, the support members 200 are connected to each other smoothly using the inclination portions 211A. This provides a more certain unification of the support members 200.

<Modifications>

In the embodiment described above, three image-capturing sections 130 are provided. Without being limited thereto, the number of image-capturing sections 130 may be two, or four or more.

Further, in the present embodiment, three image-capturing sections 130 are arranged in a line in parallel with the X-axis direction. Without being limited thereto, the three image-capturing sections 130 may be arranged in a line in parallel with the Y-axis direction, or the three image-capturing sections 130 may be arranged in an L shape. In this case, for example, the first image-capturing section 131 in the present embodiment is arranged at a corner portion of the L.

Further, in the present embodiment, an image-capturing section having a largest lens size is situated in the middle in arrangement of three image-capturing sections. Without being limited thereto, image-capturing sections each having a largest lens size may be respectively arranged at two ends in the arrangement. Furthermore, in the present embodiment, one of three image-capturing sections has a large lens size, but the configuration is not limited thereto. For example, two image-capturing sections having a large lens size and one image-capturing section having a small lens size may be provided.

Further, in the present embodiment, the first support base 210B and the annular coupling portion 210 in the first support 210 are separate from each other, but the first support base 210B and the annular coupling portion 210 may be formed integrally.

Furthermore, in the present embodiment, the second window member 320, the third window member 330, the second support 220, and the third support member 330 each have a rectangular shape having rounded angles. Without being limited thereto, the second window member 320, the third window member 330, the second support 220, and the third support member 330 may be rectangular.

Further, in the present embodiment, the inclination portions 211A are partially formed on the peripheral edge portion 217A. Without being limited thereto, the inclination portion 211A may be formed in the entirety of the peripheral edge portion 217A, and the annular portion 210A may have a shape of a frustum of a cone. Furthermore, the inclination portions 211A are respectively linearly connected to the wall portions 223 and 233. Without being limited thereto, for example, the inclination portions 211A may be respectively connected to the wall portions 223 and 233 in the form of a step.

The respective configurations of the support members, the window members, and the like described with reference to the respective figures are merely embodiments, and any modifications may be made thereto without departing from the spirit of the present technology. In other words, for example, any other configurations for purpose of practicing the present technology may be adopted.

Note that the present technology may also take the following configurations.

(1) An electronic apparatus, including:
an apparatus body that includes
a first image-capturing section,
a second image-capturing section, and
a housing that includes an attachment hole through which the first image-capturing section and the second image-capturing section are exposed;
a first window portion that covers the first image-capturing section;
a second window member that includes a second window portion that covers the second image-capturing section; and
a support member that includes
a first support that includes a first support base that supports a peripheral edge portion of the first window portion, the first support closing the attachment hole, and
a second support that is formed integrally with the first support base, the second support supporting a peripheral edge portion of the second window member, the second support closing the attachment hole,
the first support including an annular portion that is provided to a peripheral edge of the first support base and arranged between the first support base and the second support.

(2) The electronic apparatus according to (1), in which a height at which the first support is situated from the housing is greater than a height at which the second support is situated from the housing.

(3) The electronic apparatus according to (1) or (2), further including
a base member obtained by integrally forming the first support base and the second support, in which
the first support base and the annular portion are different components, and
the annular portion is an annular component that is assembled to the base member.

(4) The electronic apparatus according to any one of (1) to (3), in which
the annular portion further includes an inclination portion, and
the inclination portion covers a portion of the second support, as viewed from a direction of an optical axis of the first image-capturing section.

(5) The sensor module according to (4), in which
the attachment hole further includes
a circular first hole,
a second hole that protrudes from the first hole toward a certain diameter direction of the first hole, and
a third hole that protrudes from the first hole toward another diameter direction of the first hole that is opposite to the certain diameter direction toward which the second hole protrudes,
the second hole protruding toward the certain diameter direction has a width smaller than a length of a diameter of the first hole, and
the third hole protruding toward the other diameter direction opposite to the certain diameter direction toward which the second hole protrudes has a width smaller than a length of a diameter of the first hole.

(6) The electronic apparatus according to any one of (1) to (5), further including:
the apparatus body including

13 a third image-capturing section, and
the housing including the attachment hole through which the third image-capturing section is exposed;
a third window member that includes a third window portion that covers the third image-capturing section; and
the support member including a third support that is formed integrally with the first support base, the third support supporting a peripheral edge portion of the third window member, the third support closing the attachment hole,
the first support including the annular portion being provided to the peripheral edge of the first support base and arranged between the first support base and the third support.

REFERENCE SIGNS LIST 10 electrical apparatus
100 apparatus body
110 housing
120 attachment hole
130 image-capturing section
200 support member
210 first support
210A annular portion
210B first support base
210C base member
300 window-member group
310 first window portion
320 second window portion
330 third window portion

The invention claimed is:
1. An electronic apparatus, comprising:
an apparatus body that includes:
a first image-capturing section,
a second image-capturing section, and
a housing that includes an attachment hole through which the first image-capturing section and the second image-capturing section are exposed;
a first window portion configured to cover the first image-capturing section;
a first window member that includes a second window portion, wherein the second window portion is configured to cover the second image-capturing section; and
a support member that includes:
a first support that includes a first support base, wherein the first support base is configured to support a peripheral edge portion of the first window portion, and
the first support is configured to close the attachment hole, and
a second support that is integral with the first support base, wherein

14 the second support is configured to support a peripheral edge portion of the first window member,
the second support is configured to close the attachment hole, and
the first support includes an annular portion, wherein the annular portion is on a peripheral edge of the first support base, and
the annular portion is between the first support base and the second support.
2. The electronic apparatus according to claim 1, wherein a first height at which the first support is situated from the housing is greater than a second height at which the second support is situated from the housing.
3. The electronic apparatus according to claim 1, further comprising a base member obtained based on integration of the first support base and the second support, wherein
the first support base and the annular portion are different components, and
the annular portion is an annular component that is assembled to the base member.
4. The electronic apparatus according to claim 1, wherein the annular portion further includes an inclination portion, and
the inclination portion is in contact with the second support, as viewed from a direction of an optical axis of the first image-capturing section.
5. The electronic apparatus according to claim 1, wherein the attachment hole further includes;
a first hole, wherein the first hole is circular,
a second hole that protrudes from the first hole toward a first diameter direction of the first hole, and
a third hole that protrudes from the first hole toward a second diameter direction of the first hole that is opposite to the first diameter direction, wherein each of the second hole and the third hole has a width smaller than a length of a diameter of the first hole.
6. The electronic apparatus according to claim 1, further comprising:
the apparatus body including
a third image-capturing section, and
the housing including the attachment hole through which the third image-capturing section is exposed;
a second window member that includes a third window portion, wherein the third window portion is configured to cover the third image-capturing section; and
the support member including a third support, wherein
the third support is integral with the first support base,
the third support is configured to support a peripheral edge portion of the second window member,
the third support is configured to close the attachment hole, the first support includes the annular portion,
the annular portion is on the peripheral edge of the first support base, and
the annular portion is between the first support base and the third support.

* * * * *